United States Patent

Kirschner et al.

[11] Patent Number: 5,772,717
[45] Date of Patent: Jun. 30, 1998

[54] TEMPERING METHOD USING A TWO PHASE FLOW OF CRYOGEN

[75] Inventors: Mark J. Kirschner, Morristown; Hamdi Kozlu, Bedminster; Michael K. Sahm, Annendale, all of N.J.

[73] Assignee: The BOC Group, Inc., New Providence, N.J.

[21] Appl. No.: 716,976

[22] Filed: Sep. 20, 1996

[51] Int. Cl.$^6$ .......................... C03B 27/00; C03B 25/00; C03B 21/00; C03B 23/00

[52] U.S. Cl. .............................. 65/104; 65/114; 65/116; 65/118; 65/119; 65/348

[58] Field of Search ............................. 65/104, 114, 116, 65/118, 119, 348

[56] References Cited

U.S. PATENT DOCUMENTS

| | | | |
|---|---|---|---|
| 2,026,165 | 12/1935 | Goodwillie | 65/114 |
| 2,259,727 | 10/1941 | Bowers | 65/114 |
| 3,701,266 | 10/1972 | Chhisholm | 65/116 |
| 3,762,902 | 10/1973 | Wagner et al. | 65/60.2 |
| 3,775,087 | 11/1973 | Ritter, Jr. | 65/348 |
| 3,869,876 | 3/1975 | Gardent et al. | 62/376 |
| 4,018,590 | 4/1977 | Imler | 65/348 |

OTHER PUBLICATIONS

Introduction to Ceramics by Kingery et al., pp. 830–831, 1976.

Primary Examiner—Donald E. Czaja
Assistant Examiner—Jacqueline A. Ruller
Attorney, Agent, or Firm—David M. Rosenblum; Salvatore P. Pace

[57] ABSTRACT

A method of tempering an article is disclosed in which an article is heated so that the material making up the article is in an essentially stress-free state and the article thereafter is quenched and cooled. At the conclusion of the quenching, a stress pattern in initiated through the thickness of the article in which the midplane layer is in tension and the surface layers are in compression. This stress pattern is further developed during the cooling stage. The article is quenched by spraying the surfaces with a coolant, preferably comprising either liquid nitrogen or liquid air in the form of a two phase flow of liquid and vapor. The liquid is sprayed so that the surface tensile stress of the surface layers are not exceeded and the liquid does not accumulate on the surface layers as a film.

5 Claims, 1 Drawing Sheet

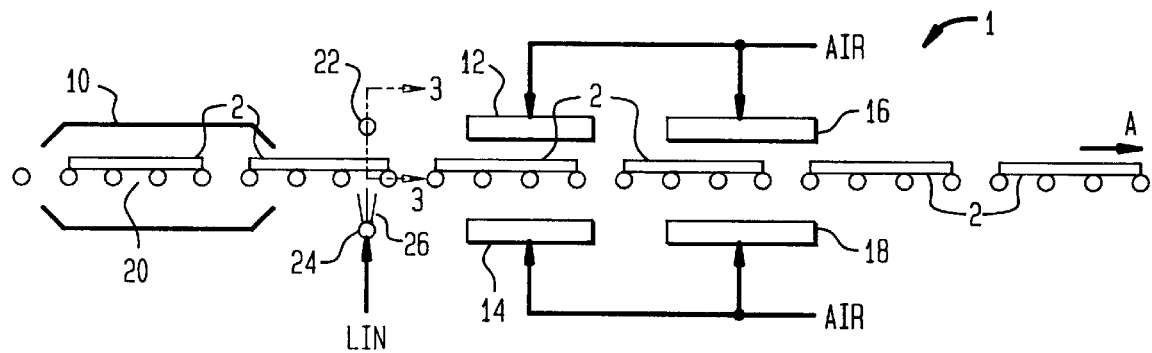
FIG. 1
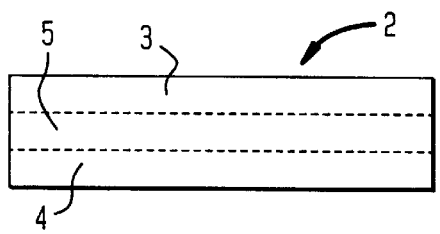
FIG. 2
FIG. 3
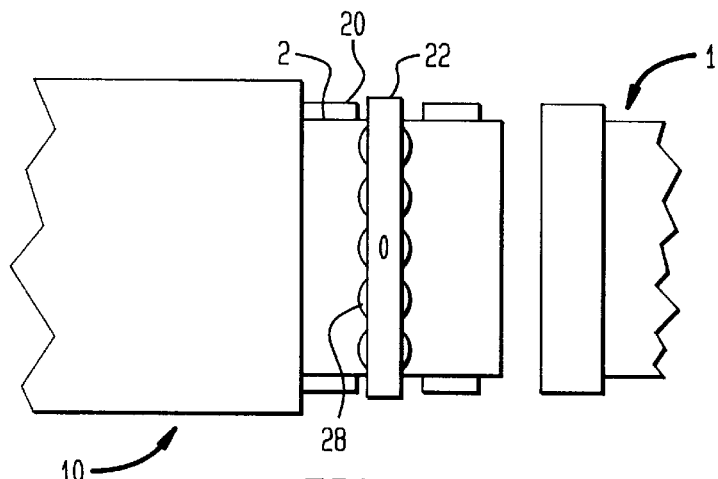
FIG. 4
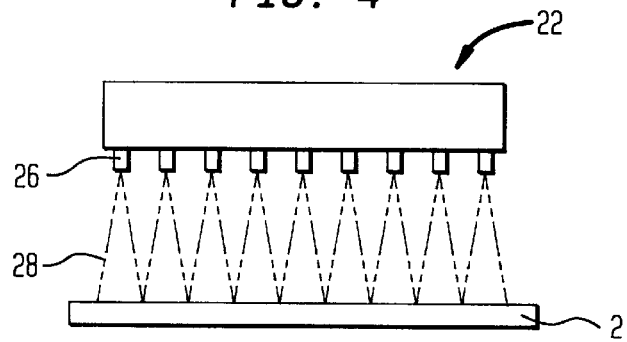

5,772,717

TEMPERING METHOD USING A TWO PHASE FLOW OF CRYOGEN

BACKGROUND OF THE INVENTION

The present invention relates to a method of tempering of an article in which midplane tensile stresses balance outer surface layer compressive stresses when the article is in a tempered state. More particularly, the present invention relates to such a method in which the article is first heated to attain an essentially stress-free state, is quenched to initiate formation of the stress pattern of the tempered state, and is then cooled to further develop and lock in the stress pattern. More particularly, the present invention relates to such a method of tempering in which the article is quenched by spraying the surface layers with a coolant, preferably formed by expanding liquid air or liquid nitrogen into a two-phase, liquid-vapor mixture.

Articles are tempered by setting up a stress pattern through the thickness of the article in which surface layers are in compression and a midplane layer, located between the surface layers, is in tension to balance the compressive stresses of the surface layers. Such materials are less susceptible to breakage and shattering than untempered articles. The tempering process is initiated by heating the article within a furnace so that it attains an essentially stress-free state often referred to in the art as the softening point. The article is then quenched to initiate formation of the stress pattern. At the conclusion of the quenching stage, the midplane layers of the article have a temperature distribution below the strain point temperature while the surface layers are considerably below the strain point temperature as a result of the temperature distribution being parabolic. It is this temperature distribution through the thickness of the article that forms the stress pattern. The stress pattern is further developed by further cooling the article to ambient.

In case of tempering of glass sheet articles, the quenching and cooling stages of the tempering process are effectuated by passing the sheets of glass between opposed air hoods. Air is of course used for tempering of articles formed from other types of material. There are limitations on the rate of production and the requisite thickness of the material to be tempered that arise from the convective heat transfer coefficient provided by the quenching and cooling medium, for instance, air. In order to improve the convective heat transfer coefficient, various prior art patents have disclosed tempering with an expanded two-phase vapor-solid mixture of carbon dioxide. This two phase flow is directed against glass sheets to be tempered. Examples of this can be found in U.S. Pat. No. 3,883,339 and U.S. Pat. No. 3, 929,442. Liquids have also been used to further increase the heat transfer coefficient. Commonly, the heated article is held within clamps and the assemblage is dipped into a bath, for instance, water. In U.S. Pat. No. 3,869,876 liquid nitrogen in a batch process is sprayed against a glass sheet held by clamps. The problem though with liquid dipping and sprays is that the liquid can form a film over the article. This film acts as an insulating layer which tends defeat the purpose of using a liquid in the first instance.

As will be discussed, the present invention provides a tempering method in which liquid is used without film formation and without exceeding the surface tensile stresses of the material forming the article so as to allow thinner sheets to be tempered than would have been conceivably treated in the prior art.

SUMMARY OF THE INVENTION

The present invention provides a method of tempering an article formed from the material having a thickness including surface and midplane layers. In accordance with the method the article is heated so that the material is an essentially stress-free state. "Essentially stress-free" as used herein and in the claims means any stress in the glass will be removed in seconds. Thereafter the article is quenched so that a stress pattern is initiated having the midplane layer in tension and the surface layers in compression. The article is cooled so that the stress pattern is further developed and the article attains the tempered state. The phrase, "further developed" as used herein and in the claims means temperature gradient is transferred into a residual stress distribution which is established during the quenching. The article is at least in part quenched by spraying the surface layers with the coolant consisting essentially of a liquid and a vapor. The coolant is sprayed so the surface tensile stresses of the surface layers are not exceeded and the liquid does not accumulate on the surface layers as a film.

As will be discussed, the foregoing is most easily accomplished with a cryogenic liquid which expands from nozzles to form a two phase flow of liquid droplets and evolved vapor. It has been found by the inventors that such liquid droplets are of such size and distribution that control of the flow rate of the cryogen can ensure that all liquid evaporates upon reaching the surface layers of the article to prevent film formation.

Although the present invention will be described with reference to sheets of glass, the present invention is not limited to any particular material or shape of article to be tempered. For instance, tempering metallic sheets is possible with the present invention as is tempering automobile backlights and sidelights and other glass articles.

BRIEF DESCRIPTION OF THE DRAWING

While the specification concludes with claims distinctly pointing out the subject matter that Applicants' regard as their invention, it is believed that the invention will be better understood when taken in connection with the accompanying drawings in which:

FIG. 1 is a schematic view of a glass tempering production line incorporating the quenching stage in accordance with the present invention;

FIG. 2 is an enlarged, side elevational view of a glass sheet being treated; and FIG. 3 is an enlarged, fragmentary, top-plane view of FIG. 1; and FIG. 4 is an enlarged, fragmentary view of FIG. 1 taken along line 3—3 thereof.

DETAILED DESCRIPTION

With reference to FIGS. 1 and 2, an apparatus 1 is illustrated for tempering glass sheets 2. Apparatus 1 is a prior art glass tempering apparatus modified in accordance with the teachings of the present invention. In terms of its prior art function, glass sheets 2 are heated in a furnace 10 so that the glass attains an essentially stress-free state sometimes referred to in the art as the softening point. Thereafter, glass sheets 2 are quenched by air directed through upper and lower air hoods 12 and 14. After having been quenched, glass sheets 2 are further cooled by a cooling stage provided by upper and lower air hoods 16 and 18. The process is a continuous process and glass plates 2 move from furnace 10 and through air hoods 12 and 16 by means of rollers 20, known in the art.

In accordance with the present invention, air hoods 12, 14, 16 and 18 function as the cooling stage. The quenching stage is effected by spraying surfaces of glass sheets 2 with a cryogenic two-phase mixture from upper and lower spray manifolds 22 and 24. As could be appreciated by those skilled in the art, a series of such manifolds could be provided for longer sheets. The mixture is formed by partly expanding a liquid cryogen, such as liquid air or nitrogen or other liquefied component of air, into a vapor. During quenching glass sheets 2 are cooled at a rate so that surface tensile stresses within surface layers 3 and 4 are not exceeded and at the conclusion thereof a midplane layer 5 has a midplane temperature below the strain point temperature of the glass. Additionally the surface layers 3 and 4 also have surface temperatures below the strain point temperature of the material. Since, however, the cooling is from the surface of each of glass sheets 2, a temperature distribution is induced to effect formation of a stress pattern within the glass having surface layers 3 and 4 set in compression and a midplane layer 5 set in tension, balancing the compressive stresses of surface layers 3 and 4.

The article is then cooled by passage through air hoods 12, 14, 16 and 18 so that the midplane temperature of midplane 5 further cools. During such cooling the stress pattern initiated at the conclusion of the quenching stage further develops to form the tempered state of the article. It is understood that as an alternative embodiment, an initial part of the quenching stage would be effected with the liquid cryogen and would then be concluded by air hoods 12, 14, 16 and 18.

The coolant is expanded into a liquid and a vapor by having been sprayed through spray nozzles 26 of upper and lower spray manifolds 22 and 24. As illustrated, the flow pattern of liquid droplets 28 are coincident with one another to completely traverse glass sheets 2. The liquid is sprayed so that the liquid coolant evaporates upon contact and thus does not accumulate on surface layers 3 and 4. Such accumulation can form a film which would have insulating properties to prevent the rapid removal of heat from surface layers 3 and 4 of glass sheets 2. Each nozzle 26 and operating conditions are selected to provide the required heat removal rate to meet final product specifications. The expansion from the liquid to gas is minimized by selecting a proper combination of flow rate, nozzle size and configuration, and other geometric parameters described below.

As can be appreciated, the liquid being sprayed in substantially uniform size droplets against the glass sheets 2 permits extremely thin articles to be tempered. By way of an example, glass sheets 2 having a length and width of about 0.5 m. and a thickness of about 2 mm can be heated within furnace 10 to an essentially stress-free point, which in case of quartz glass is in a range of between about 620° C. and about 640° C. Thereafter, each of such glass sheets can be quenched for between about 2.0 and 2.5 seconds or for an average of 2.3 seconds so that the midplane temperatures are below the strain point temperature. For such quenching, a heat transfer coefficient of about 1250 watts/$m^2$-K is required. About 0.6 and about 1.25 kilograms of liquid nitrogen are consumed for each sheet. In order to completely traverse the sheet and expand the cryogen approximately 20–30 nozzles would be used, with each nozzle having a diameter in a range of about 0.1 and about 0.4 cm. The distance between he nozzle and the glass is approximately in the range of 2 cm to 5 cm.

The present invention is not limited to the illustrated continuous process in which glass or other types of sheets are continually processed on roller. Batch processes are possible in which the articles are individually tempered. For example, sheets 2 could be individually quenched in a batch process. In such case, the process would remain the same as in the continuous process except that a flat, rectangular manifold would have to be constructed for each side of the sheet and such manifold would have about 320 nozzles. Each glass sheet would be positioned between the manifolds and quenched. Thereafter, the sheet would be positioned between air hoods for further cooling.

While the present invention has been described in relation to preferred embodiment as will occur to those skilled in the art, numerous changes, additions and omissions may be made without departing from the spirit and the scope of the present invention.

We claim:

1. A method of tempering an article formed from a material having a thickness including surface and midplane layers, said method comprising:

heating the article so that it is in an essentially stress free state;

quenching said article so that a stress pattern is initiated having said midplane layer in tension and said surface layers are in compression;

cooling said article so that said stress pattern is further developed and said article attains a tempered state;

the article being at least quenched in part by spraying said surface layers thereof with a two phase flow of coolant consisting essentially of a liquid and a vapor made up of a cryogen, the coolant being sprayed so that surface tensile stresses of said surface layers existing at initiation of quenching are not exceeded and said liquid does not accumulate on said surface layers as a film.

2. The method of claim 1, wherein said cryogen is nitrogen.

3. The method of claim 1 wherein said cryogen is liquid air.

4. The method of claim 1 wherein said article is cooled by blowing air against said surface layers of said article.

5. The method of claim 4 wherein the article is fully quenched with said coolant.

* * * * *